Figure 1:
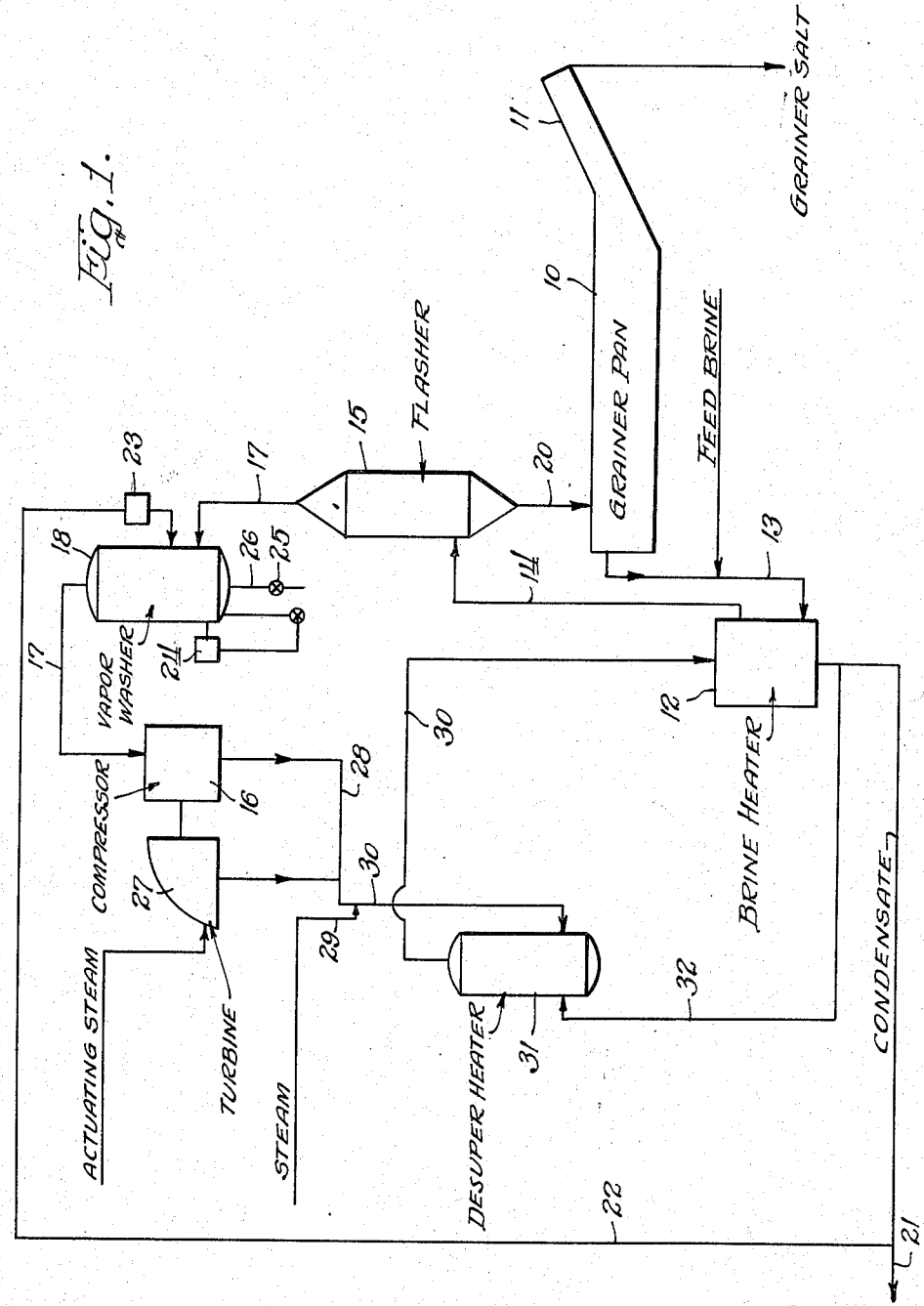

Inventor:
William H. Farnsworth

Nov. 24, 1953   W. H. FARNSWORTH   2,660,236
VAPOR RECOMPRESSION SYSTEM
Filed Jan. 15, 1947   2 Sheets-Sheet 2

Inventor:
William H. Farnsworth
By
Brown Jackson Boettcher & Dienner
Attys.

Patented Nov. 24, 1953

2,660,236

UNITED STATES PATENT OFFICE 2,660,236

VAPOR RECOMPRESSION SYSTEM

William H. Farnsworth, Manistee, Mich., assignor to Morton Salt Company, Chicago, Ill., a corporation of Illinois Application January 15, 1947, Serial No. 722,187

3 Claims. (Cl. 159—21)

This invention relates, generally, to improvements in the process and apparatus for making grainer pan salt, and it has particular relation to the application of a vapor recompression cycle in such process whereby large economies in heat consumption may be effected.

The conventional grainer pan process of making salt, and the apparatus therefor, are well known in the art. In this process, hot brine is evaporated at atmospheric pressure over a large surface area of a grainer pan, care being taken to prevent agitation of the brine surface by boiling. Due to this quiescent surface evaporation, characteristic thin, flaky crystals of salt are formed at the surface which have a relatively large surface area in respect to the mass of salt. As the crystals become sufficiently heavy they settle to the bottom of the grainer pan and are removed by reciprocating rakes. There is a considerable demand for salt made by the grainer process because of its distinctive physical properties, particularly its rapid rate of solubility.

Surface evaporation at atmospheric pressure, without boiling, is a comparatively inefficient type of evaporation, and for this reason, the grainer pan process results in a higher B. t. u. consumption per pound of salt produced by this method, than is required in making salt in vacuum pans, which make use of a more efficient type of evaporation. A representative figure for steam consumption in producing a pound of grainer salt according to good current plant practice is about 4550 B. t. u.

The object of the present invention, generally stated, is the provision of improvements in the grainer pan process of making salt, whereby a large proportion of the total water to be evaporated from the feed brine is evaporated in such an economical manner, making full use of a vapor recompression cycle, as to considerably reduce the overall heat consumption in grainer salt production. As will appear hereinafter, the present representative heat requirement of about 4500 B. t. u./lb. can be reduced by about one-half.

More specifically, an object of the present invention is the improvement in the process of making grainer pan salt, and apparatus for carrying out the same, wherein a considerable portion of the water to be evaporated from the brine, is evaporated in a flash evaporation process with the flash steam vapor being compressed to a higher temperature and utilized in heating additional brine to a temperature at which a predetermined part of it may be suitably flashed into flash steam vapor while the remainder may be vaporized in a grainer pan.

An important object of the invention is the provision of a method and apparatus wherein a substantial portion of the water content of brine for the production of grainer salt is vaporized by a flashing step making use of a vapor compressor to obtain the reduction in pressure for the flashing step and to compress the flashed steam vapors to a higher temperature, with the vapor compressor being driven by power derived from a steam turbine, and wherein exhaust steam from the turbine and the compressed steam from the vapor compressor are fully utilized in heating additional brine to a temperature at which part of it may be suitably flashed into steam vapor while the remainder may be vaporized in a grainer pan.

Other objects of the invention will, in part, be obvious and will in part appear hereinafter.

Figure 2:
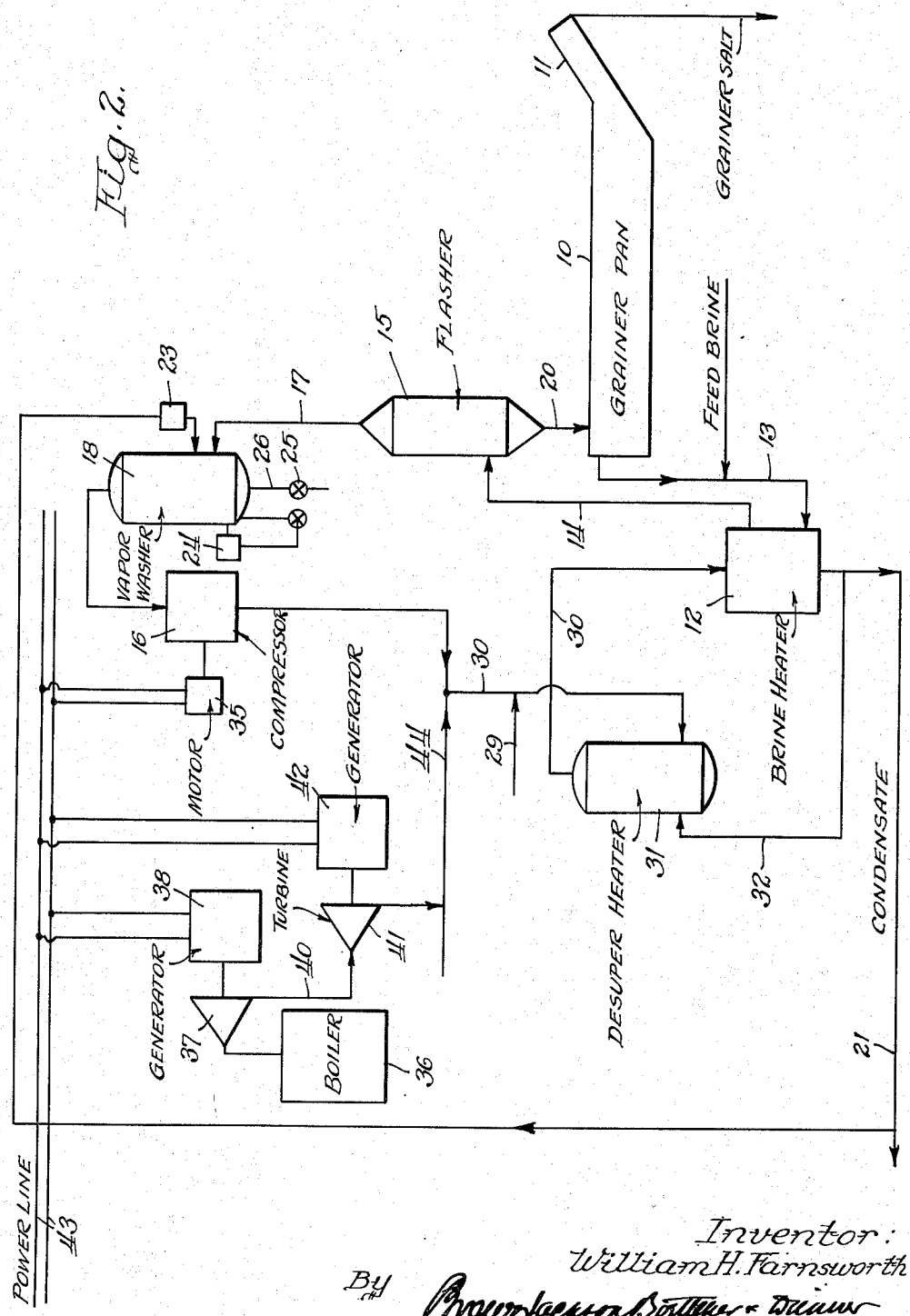

For a more complete understanding of the nature and scope of the invention reference may now be had to the following detailed description thereof taken in connection with the accompanying drawings, wherein:

Figure 1 is a diagram of a plant for producing grainer pan salt wherein a substantial portion of the total amount of water to be evaporated from the brine is evaporated in accordance with the principles of the present invention making use of a vapor recompression cycle; and Figure 2 is a diagram of a plant which is similar to that shown in Figure 1, but wherein power for driving the vapor compressor is obtained from a turbo-generator set of relatively large capacity.

Referring first to Figure 1 of the drawings, the reference numeral 10 designates a grainer pan, which may be of conventional design. Reciprocating rakes (not shown) serve to move the settled salt crystals along the bottom of the pan toward the right hand end thereof for discharge up the drain end 11.

Overflow from the grainer pan 10 and raw feed brine are fed into a brine heater 12 through the line 13. The brine on passing through the brine heater 12 may be heated to a temperature of about 225° F. by heat interchange with live steam, the source of which will be outlined in detail hereinafter.

The heated brine from heater 12 is conducted through line 14 to a flasher 15 which may be so operated as to evaporate approximately 53.5% of the total amount of water to be vaporized from the brine, by a vapor flashing step. The flasher 15 may be maintained under a vacuum of about 11.1 p. s. i. a. by interconnecting the vapor outlet of the flasher 15 to the suction side of a vapor compressor 16 through a line 17. In order to protect the compressor 16 from corrosion, it is good design practice to provide a vapor washer 18 in the line 17 so as to wash out any entrained brine which may pass off with the flash vapor.

The extent to which the brine may be evaporated in the flasher 15 is controlled by the fact that it cannot be concentrated to such an extent as to bring about the formation of salt crystals therein, since such crystals would not have the distinctive physical properties of grainer pan salt. Accordingly, the amount of vapor to be withdrawn from the flasher 15 is that amount which brings the brine to approximate saturation at the temperature at which the brine is discharged from the flasher 15 through the line 20 into the grainer pan 10. The degree of concentration of the brine in the evaporator 15 is controlled by varying the vacuum under which flashing takes place. As the vacuum is increased (i. e. absolute pressure is reduced) more water is flashed off and the temperature and the resultant vapor pressure are lowered. Conversely, as the vacuum is decreased (i. e. absolute pressure is increased) less vapor is flashed off and the temperature in the flasher is increased. The vacuum under which the flasher 15 operates is controlled by the speed of the vapor compressor 16 which serves to produce the suction.

A satisfactory set of operating conditions for the flasher 15 is as follows: The brine is fed to the flasher 15 at a temperature of about 225° F. A vacuum of 11.1 p. s. i. a. is maintained on the flasher 15 which results in a concentration of the brine to slightly under the saturation point at the temperature of approximately 214° F. The temperature of the flash steam vapors leaving flasher 15 will be about 198° F. Of course, it will be understood that the exact operating conditions are subject to adjustment by the operator within certain limits, depending largely upon local conditions. As stated before, the controlling factor which must be observed is that the brine must not be concentrated in the flasher 15 to the point where salt crystallization is induced.

The vapor washer 18 is supplied with condensate water discharged by the brine heater 12 from a condensate header 21 through line 22. A liquid level control device 23 is provided to regulate the supply of condensate into the vapor washer 18. As the flash steam vapor in line 17 passes through the vapor washer 18, any brine droplets therein are removed so that the flash steam vapor leaving the washer 18 is free of entrained brine. A salinity control 24 is provided on the vapor washer 18 which serves to automatically discharge the washing water when the salinity thereof is increased to a predetermined point. The salinity control 24 may be of the type which operates on the principle of a salt bridge so as to automatically control a discharge valve 25 in the discharge line 26.

The vapor washing step, making use of the vapor washer 18 and associated control equipment, is a conventional precaution involving known apparatus, and does not constitute a novel feature of the present invention.

The vapor compressor 16 is preferably of the rotary type and of an efficient design and may be driven by a steam powered prime mover in the form of a back pressure turbine 27 suitably connected in driving relationship with the compressor 16. Superheated steam for driving the turbine 27 may be supplied at a pressure of about 600 p. s. i. g. and a total temperature of 750°. The compressor 16 and turbine 27 may be so operated that the compressed, superheated, steam produced by the compressor 16 is discharged at a pressure of about 20.78 p. s. i. a., while the exhaust from the turbine 27 is discharged at approximately the same pressure.

The compressed steam from vapor compressor 16 and the exhaust from turbine 27 are discharged into a header 28 which connects with the brine heater 12 through a steam line 30. Preferably, a desuperheater 31 is provided in the steam line 30 which serves to desuperheat the steam from header 28 before it reaches the brine heater 12. As is well known, live or saturated steam is more efficient in heat interchange equipment than superheated steam, because of the greater rate of heat transfer. The desuperheater 31 is supplied with condensate from the brine heater 12 through line 32.

As will appear more fully, hereinafter, under the specific operating conditions stated above, the steam requirements of the brine heater 12 exceed those supplied by recompressed steam from vapor compressor 16 plus the exhaust from the turbine 27. The additional steam requirements may be added as superheated steam from line 29 connecting with line 30. This superheated steam may be furnished directly from a boiler or as the exhaust from other back pressure turbines.

Instead of supplying the additional steam requirements of the system through line 29, all, or part, of the additional steam may be supplied to the system in the form of excess actuating steam delivered to the turbine 27. The actuating steam may be supplied to the turbine 27 at any convenient pressure and temperature so long as the combined volumes of exhaust from turbine 27 and recompressed vapors from compressor 16, do not exceed the condensing capacity of brine heater 12.

When the grainer pan salt plant shown in connection with Figure 1 is operated under the typical operating conditions above mentioned in connection with the description thereof, it is possible to produce grainer pan salt at a heat consumption of approximately 2300 B. t. u. per pound of salt produced.

An efficient thermo-compressor (steam jet) could be used in place of the turbine 27 and compressor 16.

Where it is necessary to generate electrical power for use in connection with a salt plant, as is often the case, it will usually be advantageous to drive the vapor compressor 16 by an electric motor which, in turn, is energized by power generated by the power plant in the form of one or more turbogenerator sets. These units are provided in highly efficient design for operation on superheated steam.

In Figure 2 of the drawings, a grainer pan plant similar to that shown and described in connection with Figure 1 is shown wherein the vapor compressor 16 is powered from turbogenerator sets by means of an electric motor 35 connected in driving relationship therewith. A boiler 36 supplies superheated steam to a turbine 37 at a pressure which may be 600 p. s. i. g. and a total temperature of 750°. The turbine 37 is connected in direct driving relationship with a generator 38 which may, for example, be of 3000 kilowatt capacity. The exhaust from turbine 37, which may be at a pressure of about 175 p. s. i. g. and a temperature of 500° F., is exhausted through line 40 into a second turbine 41 connected in driving relationship with a generator 42, which may be of 3500 kilowatt capacity.

The generators 38 and 42 are suitably connected with a power line 43 and the electrical power may be consumed as needed in the plant, a portion of it being utilized for energizing the motor 35. This motor 35 may be of 481 kilowatt capacity if the compressor 16 is to compress 22,330 pounds of vapor per hour from a pressure of 11.1 p. s. i. a to a pressure of 20.78 p. s. i. a.

The exhaust from the turbines 37 and 41, together with the recompressed steam from the compressor 16, may be supplied to a header 44 with which the steam line 30 leading to the brine heater 12 is connected. The exhaust from the turbine 41 may be at a pressure of approximately 10 p. s. i. g. and a temperature of 240° F.

The exhaust steam from the turbines 37 and 41, plus the compressed steam discharged from vapor compressor 16, will exceed the steam requirements of the brine heater 12, and an auxiliary source of steam is not required.

It is usually preferable to drive the vapor compressor 16 in the manner described in connection with Figure 2, because of the greater operating efficiency of the large capacity turbo-generators. As is well known, greater operating efficiencies are obtained with this large capacity equipment in comparison with a smaller turbine, such as turbine 27 in Figure 1, provided that the power produced by these larger units can be suitably consumed. That portion of the steam supplied to header 44 which is not required for heating feed brine in the heater 12, may be put to such other use around the plant, such as in the various process operations requiring steam.

The efficiency of the processes of evaporation carried out in the plants described in connection with Figures 1 and 2 is made possible by the fact that these plants can efficiently utilize exhaust steam from the steam driven prime movers which serve to power the vapor compressors 16. As indicated above, the nature of the grainer pan process, requires that about one-half of the total amount of water to be evaporated, be evaporated at the brine surface in the grainer pan. It is possible to lower this ratio somewhat so that 53.5% of the water may be vaporized in the flasher 15, with 45.5% being vaporized in the grainer pan 10.

In the systems shown and described in connection with Figures 1 and 2, each pound of recompressed steam from a vapor compressor 16 will in turn evaporate approximately one pound of water in a flasher 15. Thus, by recompressing the flash steam vapor from flasher 15, the latent heat of condensation is preserved for evaporating more brine. This heat transfer is effected in the brine heater 12 wherein steam is condensed in heating feed brine. However, this recompression of flesh steam vapor is necessarily attended with the production of a certain proportion of exhaust steam, either from back pressure turbine 27 in Figure 1, or from the two turbo-generator sets in Figure 2. Fortunately, this attendant proportion of exhaust steam can be completely consumed in heating brine in heater 12 for subsequent evaporation in grainer pan 10.

The following representative operating data will serve to illustrate the heat consumption relationship in a plant of the type shown in Figure 1:

Capacity of plant—8050 lbs. grainer salt/hr.
53.5% of all water evaporated in system is evaporated in a flash chamber, while 46.5% is evaporated from the surface of a grainer pan.
Total pounds of feed brine (26% salt content)/hr.=8050/.26=31,000 lbs.
Total pounds of water evaporated/hr.=31,000 ×.74=22,950 lbs.
Pounds of water evaporated/hr. in flasher =22,950×.535=12,280 lbs.
Pounds of water evaporated/hr. in grainer pan =22,950—12,280=10,670 lbs.
Vapor leaves flasher at 198° F.—11.1 p. s. i. a.
Vapor is compressed to approximately 359° F.— 20.78 p. s. i. a.
Useable heat/lb. of flash steam vapor=1145—198 =947 B. t. u.
Useable heat in flash steam vapor/hr.=947 ×12,280=11,629,160 B. t. u.
Actuating steam @ 600 p. s. i. g.—750° TT.
Actuating steam required/lb. of flash steam vapor =.393 lb.
Useable heat in actuating steam/lb. flash steam vapor=.393 (1379—198)=465 B. t. u.
Useable heat in actuating steam/hr.=12,280 ×465=5,710,200.
Total heat available/hr. from vapor compressor and driving turbine=11,629,160
5,710,200
———
17,339,360
Each lb. of water evaporated in system requires 1325 B. t. u.
Total heat required/hr. for evaporation=1325 ×22,950=30,408,750 B. t. u.
Auxiliary heat required/hr.=30,408,750—17,339,- 360=13,069,39 B. t. u.
Total heat input to system/hr.=30,408,750—11,- 629,160=18,779,590 B. t. u.
Heat input required/lb. grainer salt =18,779,590/8050=2320 B. t. u.
Percent of heat furnished by flash steam vapor =(11,629,160/30,408,750) 100=38.4%.
Percent of heat furnished by actuating steam =(5,710,200/30,408,750) 100=18.7%.
Percent of heat furnished by auxiliary steam =(13,069,390/30,408,750) 100=42.9%.

It will be apparent that this invention is of a nature which permits of a number of modifications in respect to arrangement and choice of equipment and methods of operating the same, as long as the principles of the invention are adhered to. Accordingly, it is intended that all matter described above or shown in the accompanying drawings, be interpreted as illustrative and not in a limiting sense.

What is claimed as new is:

1. In combination with a grainer pan for making grainer salt, a brine heater, a vapor flasher, conduit means interconnecting the outlet side of said heater with the inlet side of said flasher, conduit means interconnecting said flasher with said grainer pan whereby heated, partially concentrated brine from said flasher may be delivered to said grainer pan, conduit means for delivering partially concentrated brine from said grainer pan to said brine heater, a vapor compressor, conduit means interconnecting the vapor outlet side of said flasher with the suction side of said compressor whereby flash steam vapor may be withdrawn under suction from said flasher, a steam powered prime mover, driving means operatively interconnecting said compressor in driving relationship with said prime mover, conduit means interconnecting the discharge side of said vapor compressor and the exhaust side of said prime mover with said brine heater so as to conduct heating steam thereto and de-superheater means connected in series relationship in said last mentioned conduit means wherein steam may be desuperheated before it is delivered into said brine heater.

2. The combination called for in claim 1 wherein said vapor compressor is of the rotary type, and said prime mover is a back pressure turbine connected in direct driving relationship with said compressor.

3. The combination called for in claim 1 wherein said vapor compressor is of the rotary type, said prime mover is a turbo-generator, and said driving means is an electric motor energized by said turbo-generator.

WILLIAM H. FARNSWORTH.

References Cited in the file of this patent

UNITED STATES PATENTS

| Number | Name | Date |
|---|---|---|
| Re. 12,526 | Rateau et al. | Aug. 28, 1906 |
| 1,091,721 | Weil | Mar. 31, 1914 |
| 1,105,387 | Weil | July 28, 1914 |
| 1,118,041 | Nobel et al. | Nov. 24, 1914 |
| 1,213,596 | DeBaufre | Jan. 23, 1917 |
| 1,390,677 | DeBaufre | Sept. 13, 1921 |
| 1,425,020 | Josse et al. | Aug. 8, 1922 |
| 1,478,990 | Weil | Dec. 25, 1923 |
| 1,537,563 | Suczek | May 12, 1925 |
| 1,917,841 | Hughes et al. | July 11, 1933 |
| 1,927,555 | Oetken | Sept. 19, 1933 |
| 2,184,845 | Noack | Dec. 26, 1939 |
| 2,207,646 | Van der Ploeg | July 9, 1940 |
| 2,280,093 | Kleinschmidt | Apr. 21, 1942 |
| 2,389,064 | Latham, Jr. | Nov. 13, 1945 |
| 2,441,361 | Kirgan | May 11, 1948 |
| 2,449,587 | Chambers | Sept. 21, 1948 |

FOREIGN PATENTS

| Number | Country | Date |
|---|---|---|
| 3,080 | Great Britain | Feb. 16, 1900 |
| 597,136 | Great Britain | Jan. 19, 1948 |